Aug. 10, 1926.
O. MINTON
1,595,491
APPARATUS FOR TREATING MATERIAL IN A VACUUM
Original Filed March 4, 1920   2 Sheets-Sheet 1
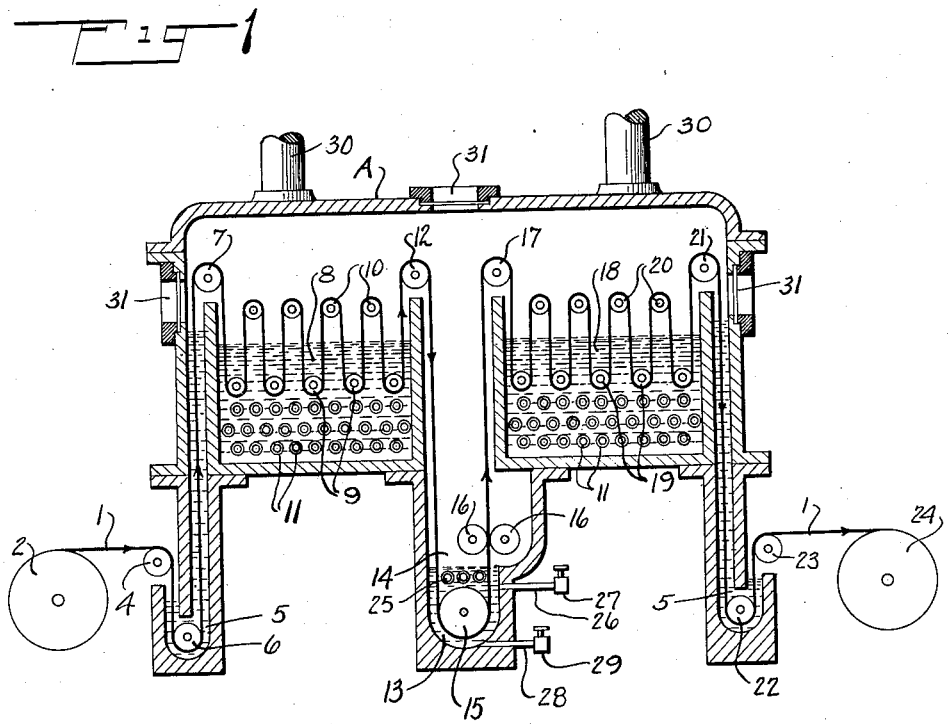

Aug. 10, 1926.  
O. MINTON  
1,595,491  
APPARATUS FOR TREATING MATERIAL IN A VACUUM  
Original Filed March 4, 1920  2 Sheets-Sheet 2
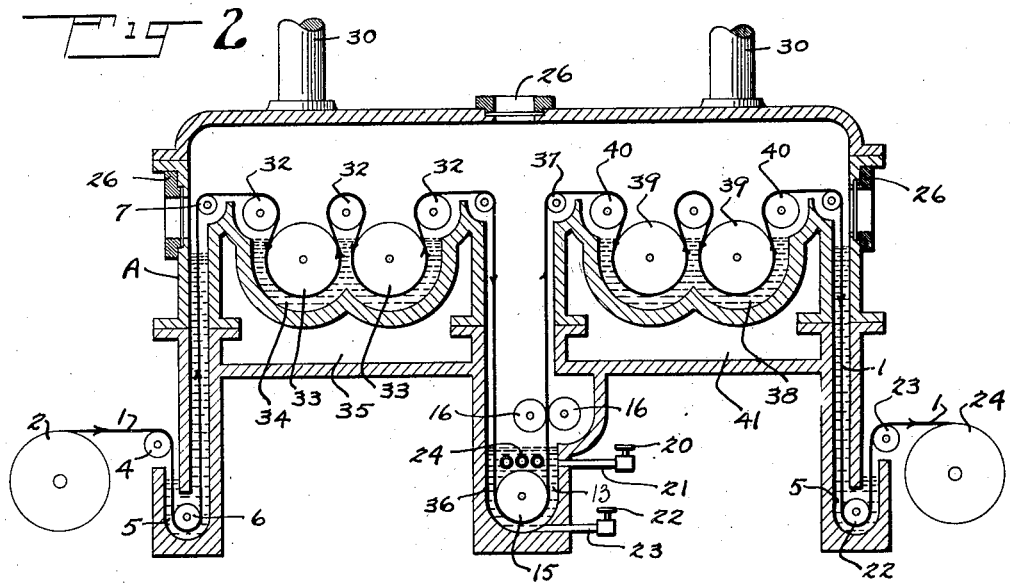
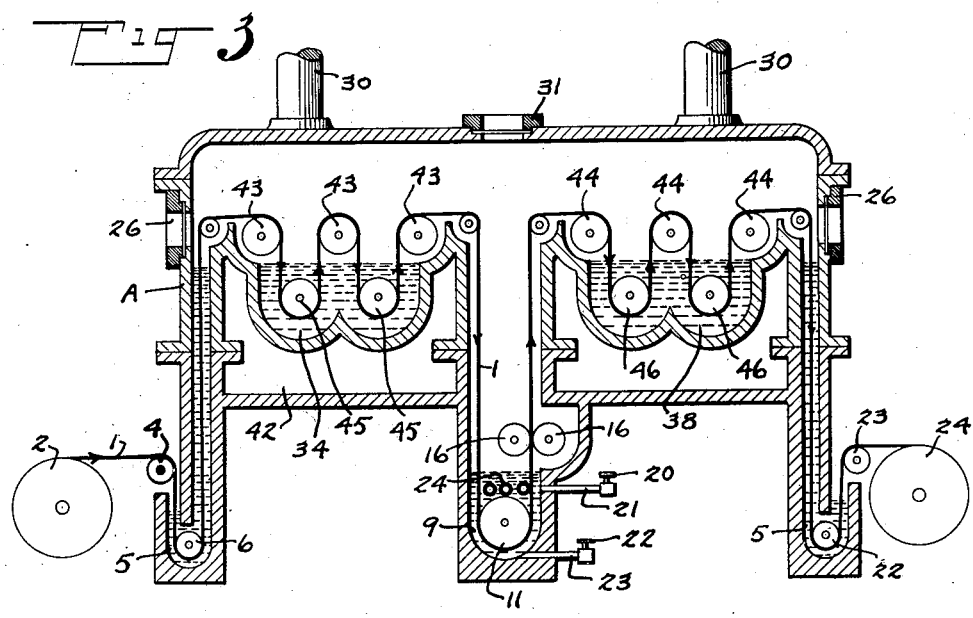
INVENTOR  
Ogden Minton  
BY Alan M. Johnson  
ATTORNEY Patented Aug. 10, 1926.

1,595,491

UNITED STATES PATENT OFFICE.

OGDEN MINTON, OF GREENWICH, CONNECTICUT.

APPARATUS FOR TREATING MATERIAL IN A VACUUM.

Original application filed March 4, 1920, Serial No. 363,351. Divided and this application filed March 20, 1922, Serial No. 545,218. Renewed February 17, 1926.

This application is a division of my co-pending application "Treatment of material in a vacuum and apparatus" filed March 4 1920, Ser. No. 363,351, my Case G.

The present invention relates to an apparatus and method for the drying of paper and other material, in a vacuum chamber, and then immediately, while still in the vacuum chamber, coating, or coloring, or sizing or impregnating the paper or other material, and then immediately drying the coated, colored, sized or impregnated paper or other material while still in the vacuum chamber.

My improved method consists in passing the material which is to be dried into a vacuum chamber through a liquid sealing medium which has no affinity for the material, subjecting it to heat to drive off its contained moisture, immediately coating or coloring, or sizing or impregnating the material while in the vacuum chamber, then subjecting the coated or colored, or sized or impregnated material to heat to drive off its contained moisture or other liquid, and then passing the material out of the chamber through a seal.

This method may be practiced by the use of various forms of apparatus, some of which are herein disclosed. In any form, however, it is essential that the apparatus be provided with a closed chamber in which a partial vacuum may be maintained. In order that the material to be dried, treated, and again dried may be continuously passed through the vacuum chamber, the latter is provided with openings closed to the admission of air by a liquid sealing medium which has no affinity for the material. The liquid seal effectively closes the entrance and exit passages against the admission of air to the chamber, but permits the passage of the material into and out of the chamber. Any other sealing means may be used.

My invention further relates to withdrawing from the sheet material substantially all, or a large portion, of its occluded air and fillng the interstices normally filled by the occluded air with a coating or impregnating compound, and then drying said coated or impregnated sheet material in the vacuum chamber before subjecting the said sheet material to atmospheric conditions.

My invention further relates to obtaining a better and more uniform product than any now known on the market. My invention further relates to the method of coating or impregnating sheet material which insures that there will be no blemishes, uneven surfaces, blisters or minute raised portions due to the air which may be held or occluded within the sheet material which, in the present practice of coating as for example with a waterproof compound, leads to rejections or discards due to these imperfections with the consequent waste of material and labor.

My invention further relates to the treatment of paper, either from the wet end of a paper machine or from a roll or reel of wet or damp paper, feeding the web of wet or damp paper into a vacuum chamber without breaking the vacuum, drying said web in the vacuum chamber and removing substantially all of its occluded air, and immediately coating or impregnating or coloring or sizing said dry web with a coating or impregnating or coloring or sizing compound, and then again drying the web, the second time with its coating or impregnating or coloring or sized compound, within the vacuum chamber and all these steps being continuous and prior to subjecting the coated or impregnated compound to the action of the atmosphere.

My invention further relates to manufacturing paper wherein the fibers are not weakened and the size in the paper is not injured or damaged due to drying at high temperatures.

My invention further relates to manufacturing colored paper and drying it without substantially impairing the coloring matter and mordants used in the paper. Among other advantages this insures that the paper will have bright colors, which will be substantially uniform in different runs of paper, permitting matching of colored paper without any appreciable difference in tone or color.

My invention further relates to rapidly and expeditiously coating or impregnating sheet material in a continuous web or sheet.

My invention further relates to sizing paper in a vacuum chamber and drying the sized paper in said vacuum chamber at such low temperatures as not to injure the fibers of the paper or the size. My invention further relates to withdrawing the occluded air from the paper and immediately drying and then filling the interstices normally filled with the occluded air with the size, and then drying the thoroughly sized paper in the vacuum chamber before it is subjected to atmospheric conditions. My invention further relates to carrying out this method continuously with a continuous web of paper which passes into and out of the vacuum chamber without breaking the vacuum.

More particularly my invention relates to passing material into a vacuum chamber, without breaking the vacuum, drying it in a heated bath, then immediately coating, coloring, sizing or impregnating the material while still in the vacuum chamber, then immediately drying the coated, colored, sized or impregnated material while still in the vacuum chamber, and then passing the dry coated, impregnated, sized or colored material out of the vacuum chamber without breaking the vacuum.

My invention further relates to certain steps, and combinations of steps, also to certain elements and combinations of elements, whereby the method or processes herein described may be carried out, as well as to certain details of construction, all of which will be more fully hereinafter described in the specification and pointed out in the claims.

The accompanying drawings, which are partly diagrammatic, illustrate several, but not the only, forms of my apparatus, by the use of which my improved method may be practiced. In these drawings the same reference numerals refer to similar parts in the several figures.

Fig. 1 is a diagrammatic vertical section of one form of apparatus;

Fig. 2 is a vertical diagrammatic section of a modified form of apparatus in which a combination of heated drums and a heated bath are used to dry and finish the material;

Fig. 3 is a vertical diagrammatic section of another modification in which different sized drums are used with a heated liquid bath to vary the finish given to the material.

In describing my invention I will describe it as applied to material in the form of paper though it is to be distinctly understood that textile fabrics may also be treated by my process and that my broader claims cover all forms of materials.

In the ordinary drying of a web of paper such high heat is used as to injuriously affect the fibers of the paper; and in case the paper is colored it will materially affect the coloring matter and mordants used. Drying paper in the high temperatures used in ordinary practice often affects the size so that the resulting paper varies in quality, is not uniform and is not a perfect product.

In coating or impregnating fabrics it is found in practice that the coated fabric will frequently have blemishes due to large or small blisters and blow holes, these often being about the size of a pin-head or a pinpoint. This is caused by the air which is held or occluded being collected, more or less, in small pockets under the coating or impregnating material, or in some cases causing minute blow holes. In waterproof fabrics this results in large quantities of the material being rejected with the consequent loss to the manufacturer.

By my invention I insure that substantially all the occluded air is withdrawn from the sheet material which will permit the coating or impregnating material, whatever it may be, to thoroughly fill these minute interstices or pockets normally occupied by occluded air, forming thereby a better and more uniform product and one devoid of blisters, blow holes or such blemishes. By my invention I immediately dry such coated or impregnated sheet material while still in the vacuum chamber so that when the sheet material emerges from the vacuum chamber the coating or impregnating material is dry and set without any danger of atmospheric pressure or atmospheric conditions spoiling or marring the finished product.

As previously stated I will describe my invention with relation to coating or impregnating paper, though it is to be understood that textile fabrics may be treated in the same manner.

The web of paper 1 is fed direct from the wet end of a paper making machine, or in some cases it may be fed from a roll or reel 2 of wet or damp paper. The web is fed into the vacuum chamber A by passing over the guide roller 4, into the liquid seal 5, under the submerging roller 6, and thence in contact with the guide roller 7. This liquid seal 5 may be of any suitable material which has no affinity for the sheet material treated and has no deleterious effect upon it. Preferably I use mercury as the sealing medium 5, but it is to be distinctly understood that any amalgam, alloy, or any other suitable liquid sealing medium may be employed which has the characteristics above specified.

The web 1 is immediately upon its entry into the vacuum chamber A dried preparatory to coating or coloring, or sizing or impregnating it. I have shown in Fig. 1 the material in the form of a web of paper 1, passing through the heated bath 8 under the submerging rolls 9, 9 and over the guide rolls 10, 10.

Preferably this bath 8 is a heated metal bath, such as mercury, which may be heated in any suitable manner, as by the steam pipes 11, 11. It is to be distinctly understood, however, that this heated bath may be of any material which has no affinity for or deleterious effect upon the material treated. It may for example be any amalgam, alloy, or any other suitable medium which has the charactertistics above specified.

By the time the web has reached the guide roll 12 it will be dry and substantially all of its occluded air will be withdrawn. Then, while still in the vacuum chamber A, it is fed through the sizing, coloring, coating, or impregnating bath 13, in the chamber 14, under the submerging roll 15 and through the squeeze rolls 16, 16 which remove all the surplus material of the bath 13.

The material is then fed over the guide roll 17 and immediately dried while still in the vacuum chamber A. I have shown a heated bath 18 which has the same characteristics as the bath 8. The coated, impregnated, sized or colored material is fed through the bath 18 under the submerging rolls 19 and over the guide rolls 20. By the time the material treated reaches the guide roll 21 it will be dry. It is then passed through the exit seal 5 under the submerging roll 22 and out over the guide roll 23. The sheet material 1 may then be cut, stacked or rolled into a roll of finished material 24.

The bath 18, may be heated in any suitable manner as by the steam pipes 11. The coated, sized, impregnating or coloring bath 13 may be heated by the steam pipes 25. The liquid forming the bath 13 may be fed into the chamber 14 through the pipe 26, controlled by the valve 27. This chamber 14 can be drained by the pipe 28, controlled by the pipe 29.

I provide the vacuum chamber A with one or more pipes 30, 30 connected to any suitable vacuum apparatus (not shown). I also provide the vacuum chamber with windows 31, 31 so that the operator can at all times observe the material as it passes continuously through the vacuum chamber A.

If the coating or impregnating material 9 is a compound including highly volatile liquids, these volatile liquids will of course boil or be given off at a lower temperature than that given above.

In my invention I thoroughly dry the coated or impregnated web at a relatively low temperature in the vacuum chamber so as not to injure its constituent fibers or elements, and also to permit the coating or impregnating compound to thoroughly set before the web is passed out of the vacuum chamber and subjected to atmospheric conditions. In my invention a smooth and fine product is obtained without blemishes, blisters or defects due to small portions of air being held under any of the coating; or seeking to escape therefrom, causing pinholes to appear on the surface.

In some cases it may be desirable to give the coated, sized, colored, or impregnated material 1 a different finish from what it would receive in the apparatus just described and illustrated in Fig. 1.

I may for example pass the web 1, Fig. 2, into the vacuum chamber A through a similar liquid seal 5 and over comparatively small guide rollers 32, 32 and in contact with relatively large submerging rollers 33, 33 which may be heated and rotated, or not, as found convenient or desirable. These rollers 33, 33 are mounted in the liquid bath 34 preferably of mercury, though of any suitable medium having the characteristics previously described in connection with the baths 8 and 18, Fig. 1. The liquid in this bath may be heated in any suitable manner as by steam, hot water or products of combustion passing through the chamber 35.

After the web 1 has been thoroughly dried by its passage through this bath 34 and in contact with the drums 33, 33 and the guide rollers 32, 32 it is immediately, while still in the vacuum chamber, passed into the compartments 36, containing the coating or impregnating liquid 13, under the roll 11, thence through the squeeze rollers 16, 16 over the guide roller 37 and through the second liquid bath 38, while in contact with the drums or cylinders 39, 39; the web passing over the guide rollers 40, 40. The liquid bath 38 is preferably mercury, but it may be of any suitable material having the characteristics previously described. This second bath may be heated in any suitable manner, as by steam, hot water, or products of combustion passing through the chamber 41. The coated or impregnated or sized or colored web is dried in the second bath 38, where the coating or impregnating or coloring or sizing material is thoroughly set in the web at relatively low temperatures which temperatures do not injure the constituent elements or fibers of the web. It is then passed out of the vacuum machine through the second liquid seal 5 under the submerging roller 22 and over the guide roller 23 where it may be immediately wound into a finished roll of coated or impregnated paper or fabric 24.

The finish of the web, particularly if it is of paper, may be still further varied by changing the size of the drums or cylinders 32, 33 and 39 and 40. These changes may be made within wide limits. Simply for purposes of illustration I have shown another variation of my invention, Fig. 3, in which the vacuum chamber A is provided with the same liquid baths 34 and 38. The guide rollers 43, 43 of the first liquid bath and the guide rollers 44, 44 of the second liquid bath are substantially the same size as the similar guide rollers 32 and 40 of Fig. 2, but the drums or cylinders 45, 45 of the first liquid bath and the drums 46, 46 of the second liquid bath are smaller than the corresponding drums 33, 33 and 39, 39, respectively, of Fig. 2. In this modification the web 1 will not have a finish quite so flat and smooth as given by the apparatus shown in Fig. 2, but will give a flatter and smoother finish than given by the apparatus of Fig. 1. While these different forms are shown, it is of course to be understood that they are simply illustrative and that my invention is not to be confined to them.

The finish given to the material treated will also depend somewhat on the depth to which the web 1 is caused to penetrate the heated liquid baths 8, 18 and 34, 38. The deeper it is forced into the bath the greater will be the pressure of the liquid upon the web.

The thermal efficiency of my vacuum method is very much greater than that of the atmospheric cylinder drying heretofore in universal use for drying paper. Theoretically, it requires about 5287 pounds of steam to dry one ton of paper at atmospheric pressure, but to compensate for convection and conduction losses, and those due to leaks in the piping system, and other inefficiencies, it has been shown in practice that about 10,600 pounds are required.

In my method, using a vacuum of about 28", the convection, conduction and piping losses are exceedingly small and the total steam required to dry a ton of paper by my method is approximately 5200 pounds.

It is an established fact that paper dried at low temperatures is much stronger than when it is dried at the high temperatures used in paper machine atmospheric drying. Paper dried in a vacuum of 28", or at a temperature of about 100° F., as in my method, is very much stronger than paper dried at atmospheric pressure, when the steam in the driers is at 228° F. When paper is dried by my method, therefore, a cheaper furnish or stock can be used and still produce a coated or impregnated or colored or sized paper equal in strength to atmospheric dried paper, in which a higher grade furnish or stock is used. In making newsprint paper, I am able to dispense with a considerable portion of the more expensive sulphite pulp, as this can be replaced with the cheaper ground wood pulp. By my method I also reduce the number of breaks in the web as it passes over the cylinder.

Furthermore, in my method there is a great saving of heat (or steam) because the process is carried on in a vacuum chamber which acts on the principle of a thermos bottle, and the steam and vapors driven out of the wet paper are caught in the closed vacuum chamber, and conducted away to the condenser. The operating room is free from steam, humidity and heat, and fans, and exhausters are dispensed with. In the use of my method the apparatus is at all times operating under definite humidity, the control of the drying can be closely standardized, and the moisture content in the paper carefully regulated.

Having pointed out the many advantages of my method and apparatus over those heretofore used, it will be apparent that the use of my invention results in great economy in the initial cost of apparatus and in large savings in cost of operation, maintenance and repairs.

Having thus described this invention in connection with illustrative embodiments thereof, to the details of which I do not desire to be limited, what is claimed as new and what is desired to secure by Letters Patent is set forth in the appended claims.

What I claim is:—

1. An apparatus for treating material including a vacuum chamber, means to permit the material to pass into and out of said vacuum chamber without breaking the vacuum, drying means including a heated bath and means mounted in the bath to exert a predetermined degree of tension on the fibers of the wet material to give the particular finish, smoothness or flatness desired, coating or impregnating means mounted in the vacuum chamber, and second drying means including a heated bath and means mounted in the bath to exert a predetermined degree of tension upon the fibers of the coated or impregnated material to give the particular finish, smoothness or flatness desired, said bath having no affinity for or deleterious effect upon said material, and means to permit the dry coated or impregnated material to pass from the vacuum chamber without breaking the vacuum.

2. An apparatus for treating paper including a vacuum chamber, means to permit the paper to pass into and out of said vacuum chamber without breaking the vacuum, drying means including a heated bath and means mounted in the bath to exert a predetermined degree of tension on the fibers of the wet material to give the particular finish, smoothness or flatness desired, coating or impregnating means mounted in the vacuum chamber, and second drying means including a heated bath and means mounted in the bath to exert a predetermined degree of tension upon the fibers of the coated or impregnated paper to give the particular finish, smoothness or flatness desired, said bath having no affinity for or deleterious effect upon said paper, and means to permit the dry coated or impregnated paper to pass from the vacuum chamber without breaking the vacuum.

3. An apparatus for treating material including a vacuum chamber, means to permit the material to pass into and out of said vacuum chamber without breaking the vacuum, drying means including a heated bath and means mounted in the bath to exert a predetermined degree of tension on the fibers of the wet material to give the particular finish smoothness or flatness desired, coating or impregnating means mounted in the vacuum chamber, and second drying means including a heated bath and rolls of the required diameter mounted in the bath to exert a predetermined degree of tension upon the fibers of the coated or impregnated material to give the particular finish, smoothness or flatness desired, said bath having no affinity for or deleterious effect upon said material, and means to permit the dry coated or impregnated material to pass from the vacuum chamber without breaking the vacuum.

OGDEN MINTON.